US007770800B2

(12) United States Patent
Martinez et al.

(10) Patent No.: US 7,770,800 B2
(45) Date of Patent: Aug. 10, 2010

(54) SIM CARD PACKAGING

(75) Inventors: Oscar Martin Martinez, Madrid (ES); Javier Perez Lafuente, Madrid (ES); Luis Hernandez Furquet, Madrid (ES); Alfonso Crespo Gonzalez, Madrid (ES); Ayelet Har, Kfar Saba (IL); Itzhak Pomerantz, Kefar Saba (IL)

(73) Assignee: SanDisk IL, Ltd., Kfar Saba (IL)

( * ) Notice: Subject to any disclaimer, the term of this patent is extended or adjusted under 35 U.S.C. 154(b) by 842 days.

(21) Appl. No.: 11/638,483

(22) Filed: Dec. 14, 2006

(65) Prior Publication Data
US 2007/0235545 A1 Oct. 11, 2007

Related U.S. Application Data

(60) Provisional application No. 60/744,602, filed on Apr. 11, 2006.

(51) Int. Cl.
*G06K 7/00* (2006.01)
(52) U.S. Cl. .................. 235/486; 235/487; 235/492
(58) Field of Classification Search ................. 235/492, 235/486, 487
See application file for complete search history.

(56) References Cited

U.S. PATENT DOCUMENTS

| 6,561,432 | B1 * | 5/2003 | Vedder et al. ............... 235/492 |
| 6,653,565 | B2 * | 11/2003 | Kashima ..................... 174/521 |
| 7,086,601 | B2 * | 8/2006 | Dhers et al. ................. 235/492 |
| 7,183,636 | B1 * | 2/2007 | Boccia et al. ............... 257/679 |
| 7,303,137 | B2 * | 12/2007 | Ho .............................. 235/492 |
| 7,559,478 | B2 * | 7/2009 | Amiot et al. ................ 235/486 |
| 2007/0252259 | A1 * | 11/2007 | Geva et al. .................. 257/679 |

FOREIGN PATENT DOCUMENTS

| DE | EP 0535436 | 4/1993 |
| EP | EP 0869452 | 10/1998 |
| JP | 11203440 | 7/1999 |

* cited by examiner

*Primary Examiner*—Ahshik Kim
(74) *Attorney, Agent, or Firm*—Vierra Magen Marcus & DeNiro LLP

(57) ABSTRACT

A device includes a carrier having a form factor of a smart card and a mechanism for reversibly retaining a card within an aperture of the carrier. The card is configured according to a standard, such as an ID-000 format, with an electronic circuitry. The mechanism can be by means of cuts, adhesive label, breakable extensions, solidifying adhesive material, connectors, etc.

19 Claims, 5 Drawing Sheets

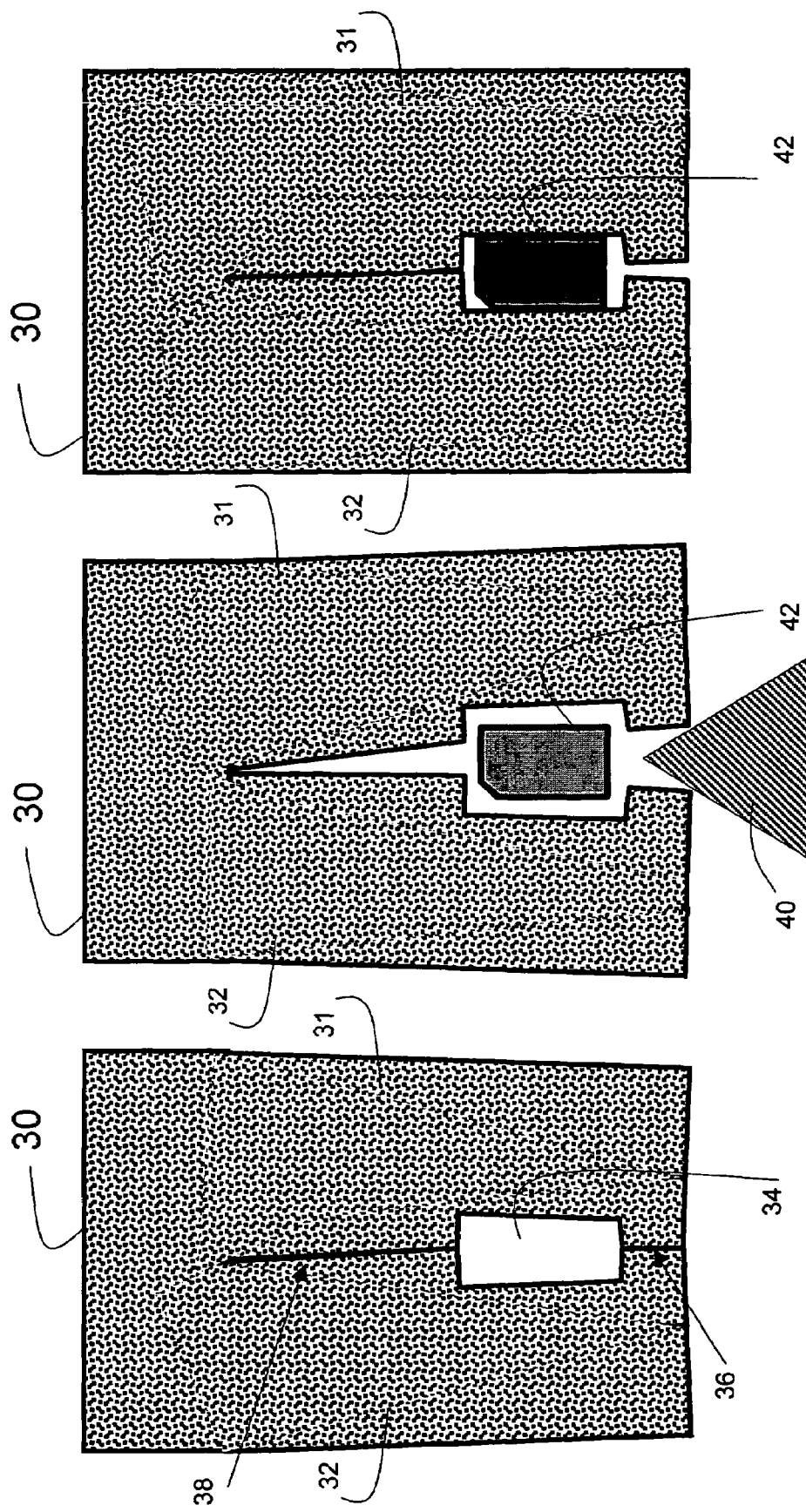

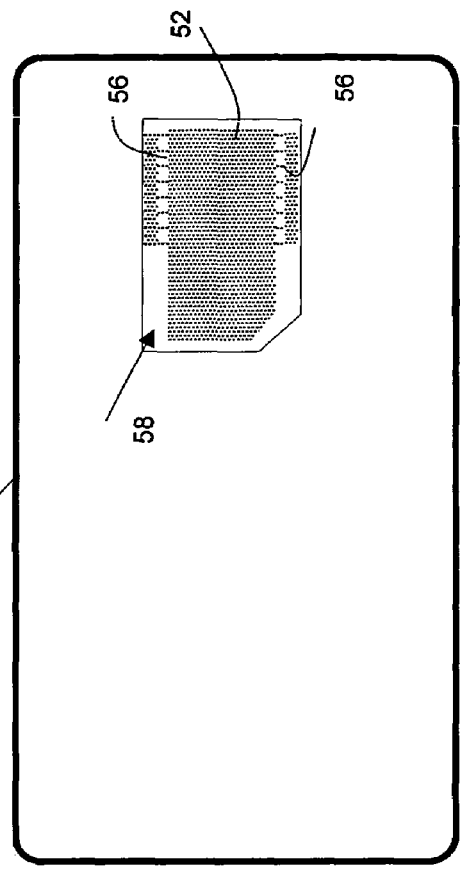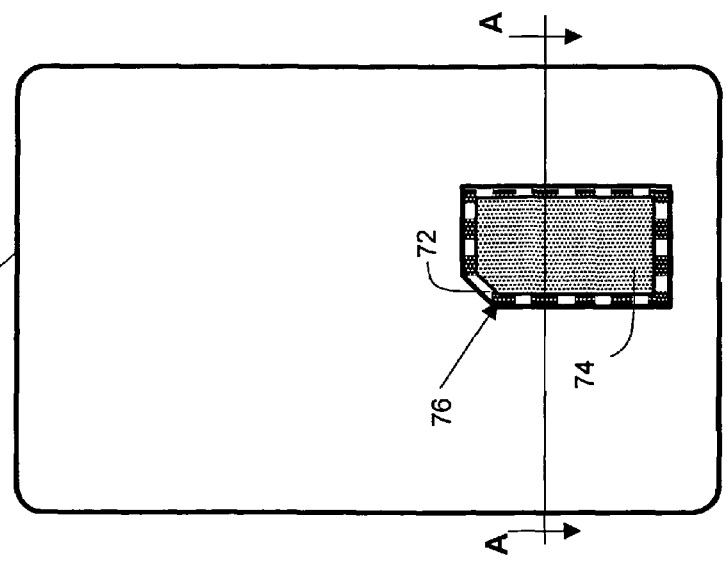

SIM CARD PACKAGING

CROSS-REFERENCE TO RELATED APPLICATIONS

This patent application claims the benefit of U.S. Provisional Patent Application No. 60/744,602, filed Apr. 11, 2006.

FIELD OF THE INVENTION

The present invention relates to methods for packaging of smart cards.

BACKGROUND OF THE INVENTION

Smart cards are very well known in the art of electronics. A smart card is defined as a pocket-sized credit card used for identification or financial transactions having an embedded integrated circuit and a memory used to provide security services, such as confidentiality of information in the memory.

A smart card is defined by a form factor that is similar to the form factor of a credit card. Smart cards known in the art are typically designed in a standard ID-1 format, for example with dimensions of 85.6 mm by 54 mm and thickness of 0.76 mm, as specified in the ISO 7810 standard. As an example, smart cards are commonly used for payment and ticketing applications (e.g. ATM cards, credit cards, debit cards, etc.), for enhancing security (e.g. electronic passports), etc.

Furthermore, the use of smart cards is becoming increasingly popular within mobile phones. Since modern mobile phones need to embed components that have the functionality of smart cards, it thus became necessary to define a smaller format in addition to the ID-1 format in order to address the needs of small terminal devices.

The ID-000 format, bearing the descriptive name 'plug-in', is defined for the purpose of designing a smart card, with typical dimensions of 25 mm×15 mm, to be plugged-in small terminal devices, such as mobile phones. The ID-000 format is presently used with GSM mobile telephones, which have very little room for a card and do not require the card to be frequently extracted. The ID-000 card used in GSM mobile phones is a special type of card defined as a SIM (Subscriber Identify Module) card or a USIM (UMTS SIM) card.

However, existing smart cards in the ID-000 format appear to be too small in dimensions to be conveniently handled and stored.

As such, it is required by mobile network operators that an ID-000 format smart card will be initially delivered to the user in ID-1 format. The user himself/herself can later extract the small-format ID-000 smart card from the larger format ID-1 card and use it within the mobile phone.

In modern ID-000 format cards, such as SIM products, where the card contains more electronics than a standard ID-1 format smart card and the net height of the electronic assembly is large and approaches the thickness of the standard ID-1 format smart card, the ID-000 card is manufactured as a separate unit from the ID-1 card. Because of various manufacturing engineering considerations, the manufacturing process of the ID-000 format card is different than the manufacturing process of a standard ID-1 format.

As such, the production process of providing an ID-000 format smart card that is packaged and delivered to the user in the ID-1 format includes a phase of assembly in which the pre-fabricated ID-000 format smart card is inserted into the pre-fabricated ID-1 format by an automated assembly machine.

Existing techniques of packaging ID-000 format smart card within an ID-1 format include inserting the ID-000 format smart card within a recess (that is configured within the ID-1 format card) and then fixing the ID-000 format smart card to this dent by means of glue, adhesive tape, or mechanical pressure. In other words, prior art secure cards include an ID-000 payload that is inserted within a dent that is configured within an ID-1 carrier, such that the dent of the carrier mechanically supports the payload from two or more directions (right, left, front, rear, top or bottom).

Referring to FIG. 1A, there is shown a schematic diagram of the way in which an ID-000 format smartcard 10 embedded with a microprocessor 12 is packaged within an ID-1 format card 14, according to a prior art packaging method.

ID-1 format card 14 is configured with a dent (not shown), forming a depression within the surface of the ID-1 format card 14, to admit ID-000 format smartcard 10. The area created by the dent to admit ID-000 format smartcard 10 is delimited with non-continuous breakable extensions 16 separated by non-continuous slits 18.

When a user wants to extract ID-000 format smartcard 10 from ID-1 format card 14 (for example, in order to plug ID-000 format smartcard 10 into a mobile phone), he/she can break the breakable extensions 16 and remove ID-000 format smartcard 10 from its positioning within the dent in ID-1 format card 14.

Referring to FIG. 1B, there is shown a cross sectional schematic diagram, along a cross section A-A of FIG. 1A. The areas of ID-1 format card 14 are separated by two non-continuous slits 18. As shown herein, the dent configured within the ID-1 format card 14 to admit ID-000 format smartcard 10 is represented by the middle area of the ID-1 format card 14.

Referring to FIG. 1C, there is shown a cross sectional schematic diagram, along a cross section B-B of FIG. 1A. The areas of ID-1 format card 14 are separated by two non-continuous slits 18. As shown herein, the dent configured within the ID-1 format card 14 to admit ID-000 format smartcard 10 is represented by the middle area of the ID-1 format card 14 including the area of the ID-000 format smartcard 10.

However, as the net height of the electronic assembly of a typical ID-000 format smart card manufactured today is large and approaches the thickness of the standard ID-1 format card, inserting the ID-000 format smart card within a dent in the ID-1 format card causes the ID-000 format card to protrude, within the ID-1 format card, from the original dimensions of a standard credit card. This leads to much inconveniency in the manufacturing and packaging processes required for distributing smart cards in this format.

SUMMARY OF THE INVENTION

Accordingly, it is a principal object of the present invention to introduce a device that includes a carrier and a pre-fabricated payload that is fully inserted within an aperture configured in the carrier to admit the payload.

An aperture refers herein to a through-hole of any shape that is cut all the way through a substance in a way that does not necessarily have the same cross sections everywhere.

Unlike the prior art methods that include inserting the carrier within a recess that is configured within the carrier, the method of the present invention includes flush-mounting the payload within an aperture that is cut all-the-way through the carrier to admit the payload.

Typically, the aperture is configured in the carrier in dimensions to be slightly larger (i.e. by some millimeters), at least in one dimension, than the payload.

In accordance with the present invention, there is provided a device that includes: (a) a carrier, having a form factor of a smartcard, and including an aperture; (b) a card, configured according to a standard and bearing electronic circuitry; and (c) a mechanism for reversibly retaining the card, in a stable manner, within the aperture of the carrier.

Preferably, the card is a SIM card. Alternatively, the card is a USIM card. More alternatively, the card is a RUIM card.

Preferably, the aperture of the carrier is slightly larger (by not more than a few millimeters), at least in one dimension, than the card.

Preferably, the standard includes an ID-000 format card.

Preferably, the mechanism includes a substance that is attached to the carrier. Optionally, the mechanism includes a substance that is attached to the card.

Preferably in one embodiment, the mechanism includes at least one cut through at least a part of the carrier, to allow the carrier to be reversibly distorted to admit the card.

Preferably, the mechanism includes a breakable extension attached to at least a part of the card.

Preferably, the mechanism includes an adhesive label.

Preferably, the mechanism includes a solidifying adhesive material.

Preferably, the mechanism includes at least one connector attached to the carrier along at least a part of the aperture within the carrier. More preferably, the connector is a shelf.

In accordance with the present invention, there is further provided a method of packaging a card, that bears electronic circuitry, and is configured according to a standard, the method includes the steps of: (a) configuring a carrier to have a form factor of a smart card; (b) providing an aperture, within the carrier; and (c) reversibly attaching the card within the aperture of the carrier.

Preferably, the aperture of the carrier is slightly larger, at least in one dimension, than the card.

Preferably, the reversibly attaching includes cutting through at least a part of the carrier to allow the carrier to be reversibly distorted to admit the card.

Preferably, the reversibly attaching includes attaching a breakable extension to at least a part of the card.

Preferably, the reversibly attaching includes attaching an adhesive label to the carrier.

Preferably, the reversibly attaching includes attaching at least one connector to the carrier, along at least a part of the aperture within the carrier, and then attaching at least a part of the card to this connector. More preferably, the connector is a shelf.

Preferably, the reversibly attaching is effected by using a solidifying adhesive material.

Additional features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections or elements throughout, and in which:

FIG. 2A is a schematic view of a pre-fabricated carrier of the present invention having an ID-1 form factor;

FIG. 2B is a schematic view, showing the way in which a pre-fabricated payload is inserted into an aperture of the carrier of FIG. 2A using a wedge, in accordance with a first embodiment of the present invention;

FIG. 2C is a schematic view of the payload of FIG. 2B embedded within the aperture of the carrier of FIG. 2B;

FIG. 3A is a schematic view of a payload that is inserted within an aperture of a carrier using a mechanism that is attached to the payload, in accordance with a second embodiment of the present invention;

FIG. 3B is a schematic view of a payload that is inserted within an aperture of a carrier using a mechanism that is attached to only a part of the payload;

DETAILED DESCRIPTION OF THE PREFERRED EMBODIMENTS

Figure 1C:
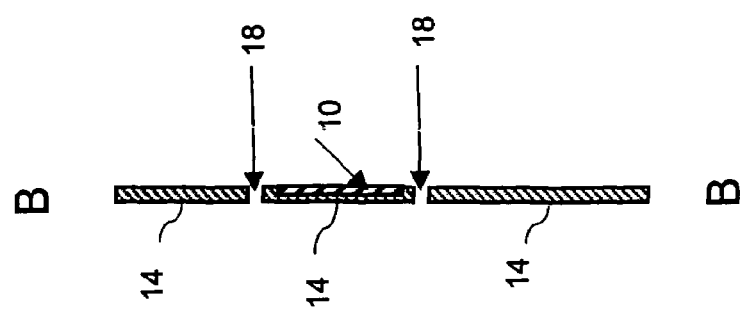
FIG. 1C is a cross section of the ID-1 card of FIG. 1A along a cross section B-B of FIG. 1A.
Figure 1B:
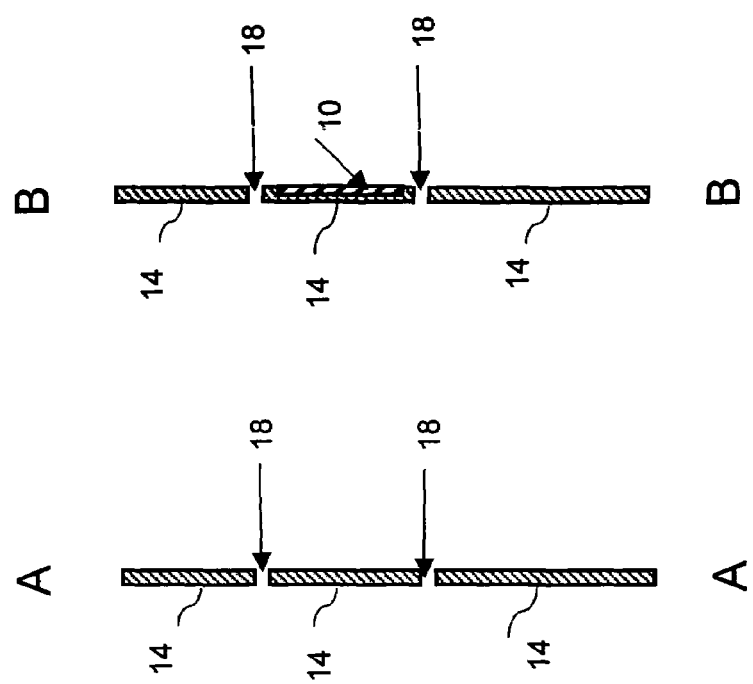
FIG. 1B is a cross section of the ID-1 card of FIG. 1A along a cross section A-A of FIG. 1A.
Figure 1A:
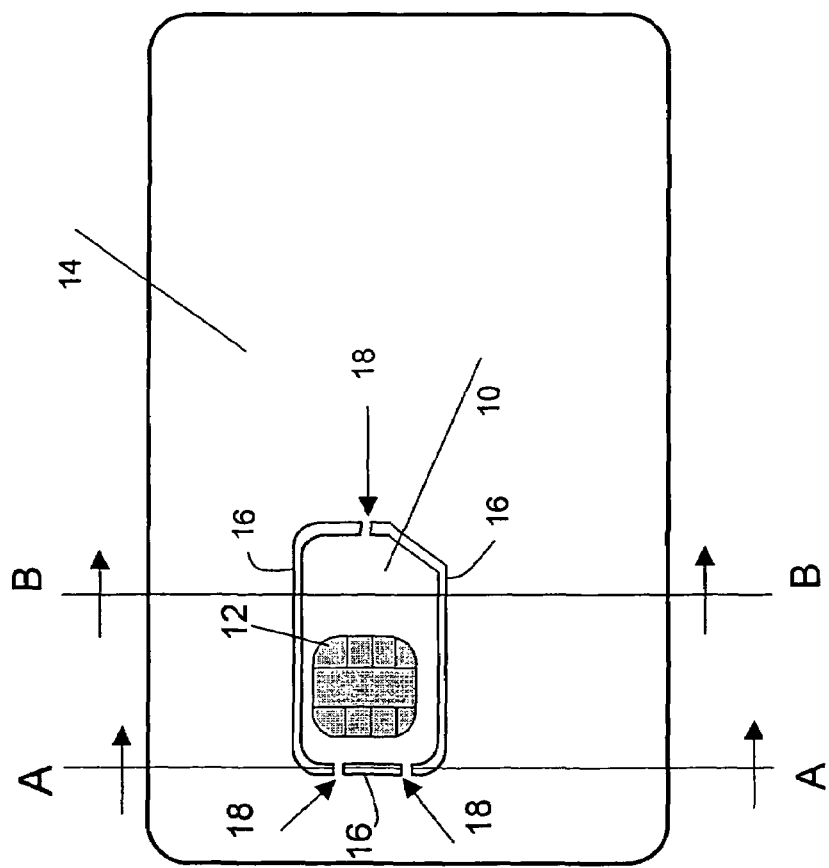
FIG. 1A is a prior art schematic diagram showing the way in which an ID-000 format smartcard is packaged within an ID-1 format card, according to a prior art packaging method.

The present invention is a device including a carrier and a pre-fabricated payload that is fully inserted within an aperture configured in the carrier to admit the payload.

An aperture refers herein to a through-hole of any shape that is cut all the way through a substance in a way that does not necessarily have the same cross sections everywhere.

Typically, the aperture is configured in the carrier in dimensions to be slightly larger (i.e. by some millimeters), at least in one dimension, than the payload.

The carrier can be manufactured to include the aperture for example. Optionally, the aperture can be configured in the carrier by means of cutting a part of the carrier all the way through the carrier to admit the payload.

A carrier is defined herein as a device for carrying a detachable smart card. Typically, the carrier of the present invention has a form factor of a standard secured device. As an example, the carrier is an ID-1 form factor with dimensions of 85.6 mm by 54 mm and thickness of 0.76 mm.

A payload, such as a SIM card, a USIM card, a RUIM (Removable User Identity Module) card, is defined herein as a smart card sized (typically 25 mm by 15 mm) to be carried within the carrier.

Typically, the payload of the present invention is flush-mounted within the aperture in the carrier, such that the dimensions of the inserted payload do not extend beyond the dimensions of the carrier and the overall design of the carrier including the payload maintains the form factor of a typical credit card. Nevertheless, the device of the present invention is not limited to such case, and the dimensions of the payload flush-mounted within the aperture in the carrier can further protrude out from the dimensions of the carrier (in case the payload is thicker than the carrier for example).

Referring now to FIG. 2A, there is shown a schematic view of a pre-fabricated carrier 30 having an ID-1 form factor. Carrier 30 includes an aperture 34 of approximately the shape and size of a payload 42 (see FIG. 2B) and two cuts 36, 38 that split carrier 30 into two connected parts 32 and 31.

Referring to FIG. 2B, there is shown a schematic view of the manner in which a pre-fabricated payload 42 is inserted into the aperture 34 of carrier 30 of FIG. 2A using a wedge, in accordance with a first embodiment of the present invention. Two cuts 36 and 38 are part of a configuration of carrier 30 that are provided to allow carrier 30 to be reversibly distorted to admit payload 42.

Pressing a wedge 40 into the cut 36 of the carrier 30 applies elastic pressure on the carrier 30 that widens the aperture 34 by separating the carrier's two connected parts 32 and 31, so payload 42 is easily inserted into aperture 34. By removing the wedge 40, payload 42 is pressed within the carrier 32.

Referring to FIG. 2C, there is shown a schematic view of the pre-fabricated payload 42 embedded within the aperture 34 of carrier 30. After payload 42 is inserted into the aperture 34 of carrier 30, carrier 30 assumes its original ID-1 form factor. For extracting payload 42 out of carrier 30, the two elastic connected parts 32, 31 can be bent (or broken).

Referring to FIG. 3A, there is shown a schematic view of a pre-fabricated payload 74 that is inserted within an aperture 72 of carrier 70 using a mechanism that is attached to the payload, in accordance with a second embodiment of the present invention. Payload 74 is firmly kept inside carrier 70 by discrete globs or droplets 76 of an adhesive substance that solidify between the payload 74 and the carrier 70. In order to separate the payload 74 from the carrier 70 and extract the payload 74, the user breaks the solidified pieces 76 of the adhesive substance.

Referring to FIG. 3B, there is shown a schematic view of a pre-fabricated payload 52 that is inserted into a carrier 50 using a mechanism that is attached to only a part of the payload. By way of example only, the mechanism of FIG. 3A includes a thin breakable extension 56 that is attached to the payload 52.

An aperture 58, typically formed by means of cutting all the way through a portion of carrier 50, of a size that is slightly larger than the size of a standard ID-000 card (i.e. sufficiently larger than the payload by not more than a few millimeters to allow easy insertion of the payload, but not so much larger than the payload that will make it difficult to maintain the payload within the carrier), is provided to fully accommodate payload 52 and the breakable extension 56.

Payload 52 and the breakable extension 56 are kept within aperture 58 by gluing breakable extension 56 to opposite sides of aperture 58. A user can then extract payload 52 out of carrier 50 by breaking the thin breakable extension 56 and pressing payload 52 out from the carrier 50.

Figure 4B:
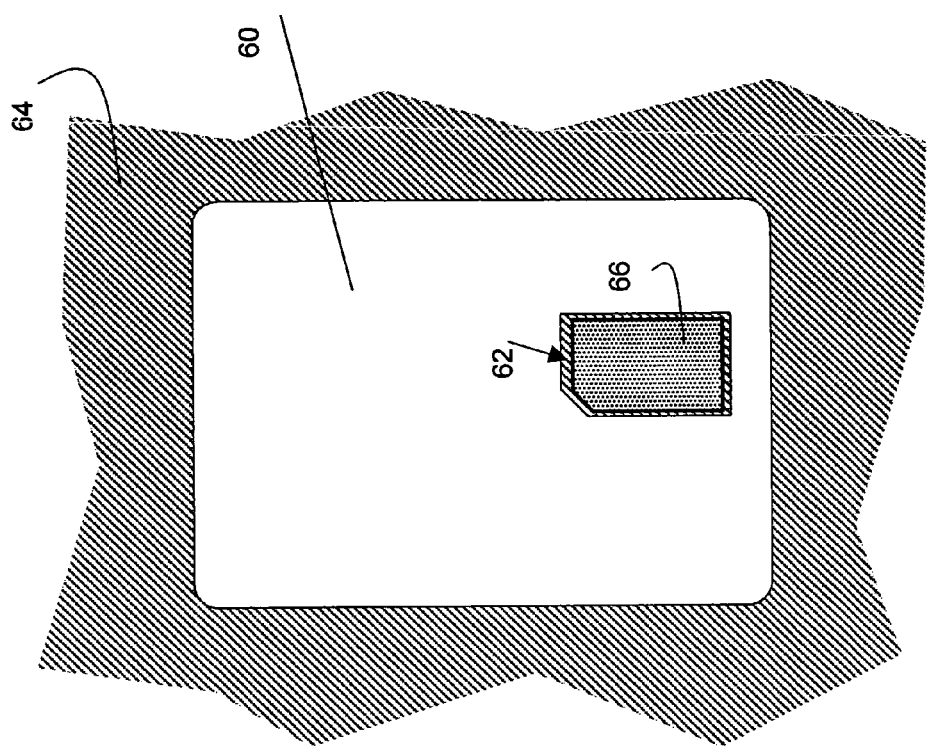
FIG. 4B is a schematic view of a pre-fabricated payload inserted into the carrier of FIG. 4A.
Figure 4A:
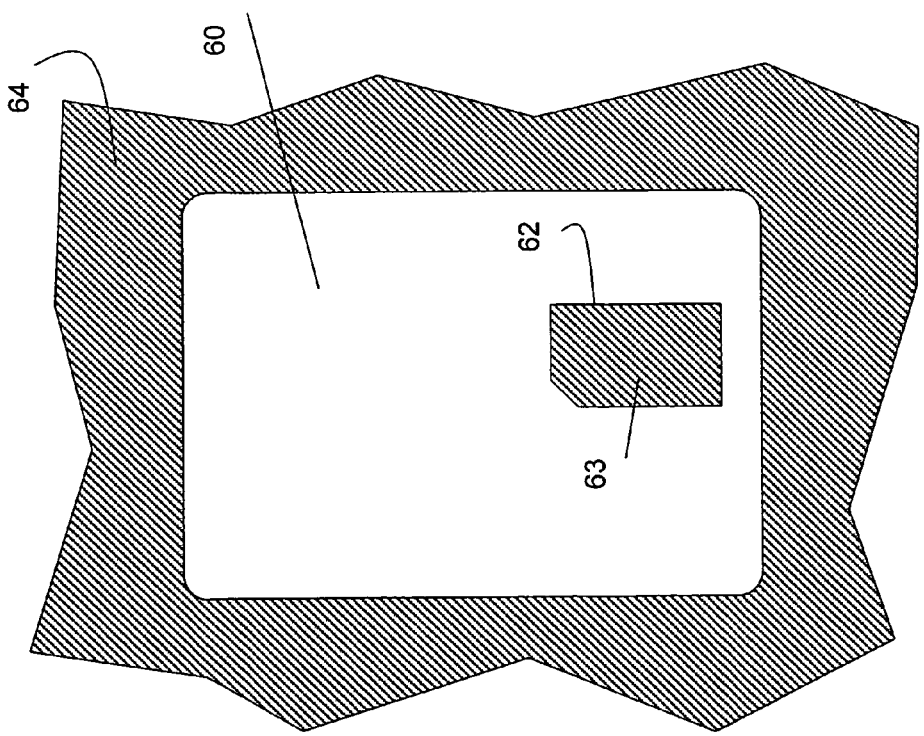
FIG. 4A is a schematic view of a carrier including a mechanism that is attached to the carrier, in accordance with a third embodiment of the present invention.

Referring to FIG. 4A, there is shown a carrier 60 including a mechanism that is attached to the carrier 60, in accordance with a third embodiment of the present invention. By way of example only, the mechanism of FIG. 4A includes an adhesive label 64 that is attached to the carrier 60, such that a first part of the adhesive label 64 extends beyond carrier 60. The carrier 60 includes an aperture 62, typically formed by cutting all the way through a portion of carrier 60, of a size that is slightly larger than the size of a standard ID-000 card, such that a second part 63 of the adhesive label (corresponding to the positioning of the aperture 62 within carrier 60) seals the aperture 62.

Referring to FIG. 4B, there is shown a schematic view of a pre-fabricated payload 66 inserted into the carrier 60 of FIG. 4A. Payload 62 is positioned within the aperture 62 upon and adhering to the second part of the adhesive label 63.

As an example only, the material of which the adhesive label is made from is designed in order to position the payload within the aperture in the carrier such that the thickness of the payload does not extend beyond the dimensions of the carrier. As such, the dimensions of the inserted payload do not extend beyond the dimensions of the carrier and the overall design of a typical credit card is maintained.

After payload 62 is inserted into carrier 60, the first part of the adhesive label 64 that extends beyond the carrier 60 is removed (e.g. by cutting). For extracting the payload 62 out of carrier 60, a user can simply pull payload 62 out of carrier 60.

Figure 5B:
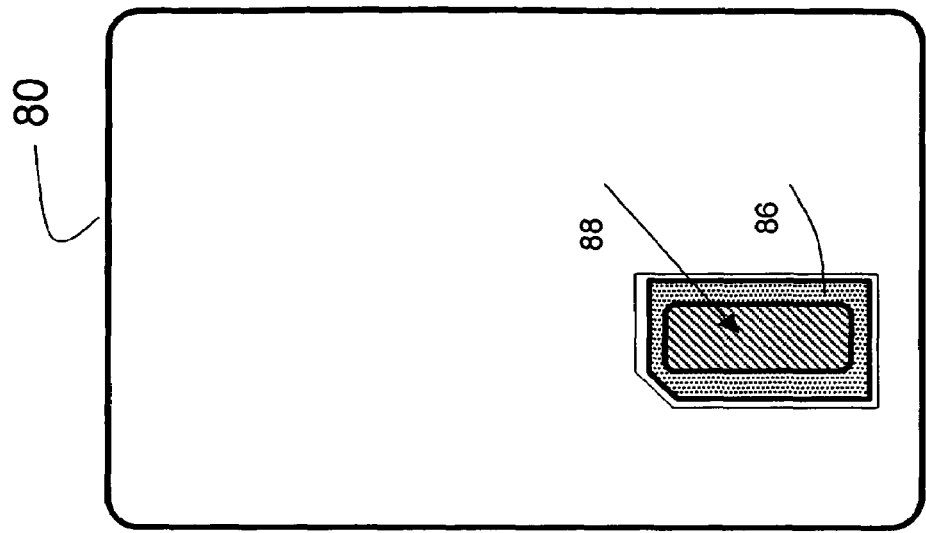
FIG. 5B is a top view of a payload inserted inside the carrier of FIG. 5A.
Figure 5A:
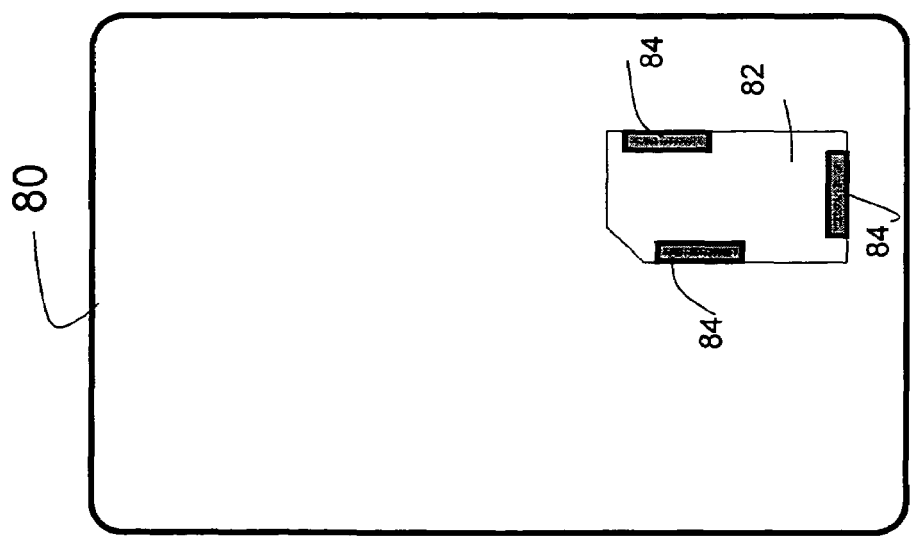
FIG. 5A is a top view of a carrier including a mechanism that is attached to the carrier, in accordance with a fourth embodiment of the present invention.

Referring to FIG. 5A, there is shown a top view of a carrier 80 including a mechanism that is attached to the carrier 80, in accordance with a fourth embodiment of the present invention. Carrier 80 includes an aperture 82 of a size that is slightly larger than a standard ID-000 card.

By way of example only, the mechanism of FIG. 5A includes connectors 84, typically made of the same material as the carrier 80 (i.e. by injection molding of carrier 80 or by machining carrier 80), in at least two locations along the sides of the aperture 82 of the carrier 80 to support the positioning of payload 88 within aperture 82 of carrier 80. Typically, the connectors include a type of shelves that support the positioning of payload 88 within aperture 82 of carrier 80.

Referring to FIG. 5B, there is shown a top view of a payload 88 inserted into carrier 80 of FIG. 5A. An adhesive label 86, attached underneath at least part of payload 88, is provided to hold payload 88 onto connectors 84 of carrier 80. The adhesive label 86 including payload 88 is then glued to connectors 84 using solidifying glue or self adhesive pieces of tape.

Attaching such an adhesive label can be further useful for printing a serial number upon the payload, for example.

Preferably, the connectors and the adhesive label attached underneath the payload are designed with a thickness such that the combined thickness of the payload and the adhesive label upon the connectors, within the aperture, do not extend beyond the thickness of the carrier.

The exemplary device of the present invention that is described above is a carrier having an ID-1 form factor and to a payload having an ID-000 form factor. It will be understood that other devices are possible within the scope of the invention, thus relating to any functional component that is flush-mounted within an aperture that is formed all the way through the thickness of another, typically a larger, functional component, such that the smaller functional component is positioned in a direction that is parallel to the other larger functional component.

It should be further noted that although the payload of the present invention is preferably flush-mounted within the aperture in the carrier, such that the dimensions of the inserted payload do not extend beyond the dimensions of the carrier, the dimensions of the inserted payload can further protrude out from the dimensions of the carrier (in case the payload is thicker than the carrier for example) within the scope of the present invention.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A device comprising:
   a card, configured according to a standard and bearing electronic circuitry, and
   a carrier, having a form factor of a smartcard, and including an aperture and a first cut from an edge of the carrier to a side of the aperture, wherein the first cut allows elastic manipulation of two portions of the carrier adjacent the first cut for allowing insertion of the card into the aperture.

2. The device of claim 1, wherein said card is a SIM card.

3. The device of claim 1, wherein said card is a USIM card.

4. The device of claim 1, wherein said card is a RUIM card.

5. The device of claim 1, wherein said aperture of said carrier is slightly larger, at least in one dimension, than said card.

6. The device of claim 1, wherein said standard includes an ID-ooo format card.

7. The device of claim 1, further comprising an adhesive substance that is attached to said carrier.

8. The device of claim 1, further comprising an adhesive substance that is attached to said card.

9. The device of claim 1, further comprising a breakable extension attached to at least a part of said card.

10. The device of claim 1, further comprising an adhesive label affixed to the carrier and covering the aperture.

11. The device of claim 1, further comprising at least one connector attached to said carrier along at least a part of said aperture within said carrier.

12. The device of claim 11, wherein said at least one connector includes at least one shelf.

13. A method of packaging a card, that bears electronic circuitry, configured according to a standard, the method comprising the steps of:
configuring a carrier to have a form factor of a smart card;
providing an aperture, within said carrier;
providing a first cut from an edge of the carrier to a side of the aperture; and
elastically manipulating the first cut to widen the aperture and insert the card.

14. The method of claim 13, wherein said aperture of said carrier is slightly larger, at least in one dimension, than the card.

15. The method of claim 13, further comprising attaching a breakable extension to at least a part of the card.

16. The method of claim 13, further comprising attaching an adhesive label to said carrier such that the adhesive label covers the aperture.

17. The method of claim 13, further comprising attaching at least one connector to said carrier, along at least a part of said aperture within said carrier, and attaching at least a part of the card to said at least one connector.

18. The method of claim 17, wherein said at least one connector includes at least one shelf.

19. The method of claim 13, further comprising attaching the card to the carrier with an adhesive substance.

* * * * *